(12) United States Patent
Banerjee et al.

(10) Patent No.: US 9,230,022 B1
(45) Date of Patent: Jan. 5, 2016

(54) CUSTOMIZABLE RESULT SETS FOR APPLICATION PROGRAM INTERFACES

(75) Inventors: Soumyadip Banerjee, Bellevue, WA (US); Christopher E. Browder, Bellevue, WA (US); Dilip Iyer, Issaquah, WA (US)

(73) Assignee: Amazon Technologies, Inc., Seattle, WA (US)

(*) Notice: Subject to any disclaimer, the term of this patent is extended or adjusted under 35 U.S.C. 154(b) by 105 days.

(21) Appl. No.: 13/593,017

(22) Filed: Aug. 23, 2012

(51) Int. Cl.
*G06F 17/30* (2006.01)

(52) U.S. Cl.
CPC .... *G06F 17/30864* (2013.01); *G06F 17/30696* (2013.01)

(58) Field of Classification Search
CPC ................ G06F 17/30864; G06F 17/30554; G06F 17/30991; G06F 17/30696
USPC ........................................................ 707/722
See application file for complete search history.

(56) References Cited

U.S. PATENT DOCUMENTS

| | | | | |
|---|---|---|---|---|
| 5,129,086 A * | 7/1992 | Coyle, Jr. | ................... | C06F 8/00 707/999.003 |
| 5,781,892 A * | 7/1998 | Hunt | ................... | G06Q 10/025 705/5 |
| 5,870,717 A * | 2/1999 | Wiecha | ............... | G06Q 30/0601 235/385 |
| 6,496,833 B1 * | 12/2002 | Goldberg | .......... | G06F 17/30392 1/1 |
| 6,587,849 B1 * | 7/2003 | Mason | ................... | G06Q 30/02 1/1 |
| 6,769,009 B1 * | 7/2004 | Reisman | ................... | G06F 8/65 705/27.1 |
| 6,792,605 B1 * | 9/2004 | Roberts | ................... | H04L 29/06 709/202 |
| 7,353,464 B1 * | 4/2008 | Kundu | .............. | G06F 17/30392 707/999.01 |
| 7,568,023 B2 * | 7/2009 | Green et al. | ................... | 709/224 |
| 7,831,633 B1 * | 11/2010 | Chan | ................. | G06F 17/30569 707/803 |
| 7,962,481 B2 * | 6/2011 | Ganesh et al. | ................. | 707/732 |
| 8,010,904 B2 * | 8/2011 | Prabhu | .......................... | 715/765 |
| 8,356,059 B2 * | 1/2013 | Wiljanen et al. | .............. | 707/803 |
| 8,463,770 B1 * | 6/2013 | Thirumalai | ....... | G06F 17/30867 707/692 |
| 2004/0210445 A1 * | 10/2004 | Veronese | ................... | G06F 8/10 705/1.1 |
| 2005/0055381 A1 * | 3/2005 | Ganesh | ............. | G06F 17/30516 1/1 |
| 2005/0203836 A1 * | 9/2005 | Woodward | ............. | G06Q 10/10 705/39 |
| 2005/0210004 A1 * | 9/2005 | Focazio | ............ | G06F 17/30427 1/1 |
| 2006/0122968 A1 * | 6/2006 | Naam | ................ | G06F 17/30696 1/1 |
| 2006/0224587 A1 * | 10/2006 | Zamir | ................ | G06F 17/30867 1/1 |
| 2007/0214420 A1 * | 9/2007 | Guertler | ............... | G06F 17/3089 715/742 |
| 2007/0234271 A1 * | 10/2007 | Winkler | ..................... | G06F 8/30 717/100 |
| 2008/0288863 A1 * | 11/2008 | Bohannon | ............... | G06Q 30/02 715/255 |
| 2009/0300151 A1 * | 12/2009 | Friedman | ............. | G06F 11/3664 709/222 |
| 2010/0125613 A1 * | 5/2010 | Wiljanen | .......... | G06F 17/30038 707/803 |
| 2010/0287198 A1 * | 11/2010 | Salman | ............. | G06F 17/30864 707/769 |
| 2011/0040155 A1 * | 2/2011 | Guzak | ................... | G06F 3/0484 600/300 |
| 2011/0107346 A1 * | 5/2011 | Engbers | ............. | H04N 21/4431 719/313 |
| 2011/0161991 A1 * | 6/2011 | Graham, Jr. | ............ | G06F 9/541 719/328 |
| 2012/0317109 A1 * | 12/2012 | Richter | ............. | G06F 17/30867 707/734 |
| 2013/0275999 A1 * | 10/2013 | Gordon | ................... | G06F 21/56 719/318 |

* cited by examiner

*Primary Examiner* — Jean B Fleurantin
*Assistant Examiner* — Nargis Sultana
(74) *Attorney, Agent, or Firm* — Thomas | Horstemeyer, LLP

(57) ABSTRACT

Disclosed are various embodiments for custom result set definitions. A result set definition is obtained responsive to a request from a client. A result customization application generates and executes application program interface calls to generate response data having a fixed schema. The result customization application performs transformations on the response data to generate a result set conforming to the result set definition.

21 Claims, 5 Drawing Sheets

CUSTOMIZABLE RESULT SETS FOR APPLICATION PROGRAM INTERFACES

BACKGROUND

Application program interfaces facilitate access to data for third parties. The customizability of available data may be limited by the application program interfaces returning data in a fixed schema.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Systems may make application program interfaces (APIs) available to facilitate access by other parties to relevant data. For example, in an electronic commerce system, APIs may expose item, sales, or browsing data to third party merchants. By using APIs, the system can control what data is accessible, and the schema in which the data is returned. Problems can arise due to the fixed schemas of API results. An API may return more data attributes than is required by the third party, increasing the network bandwidth and memory used in executing the API calls. Also, multiple APIs may be required to access conceptually related data. For example, if a third party wanted to compile data on product prices for various product categories, the third party may need to execute multiple calls to a "product category" API, and then iteratively make multiple calls to a "product" API using values returned by the "product category" API. This increases the complexity in constructing calls, and increases network traffic by handling the many requests and responses.

Customizable result set definitions allow third parties to specify the attributes and relationships to be expressed in their results. The system can then parse the result set definition to determine the appropriate API calls and data transformations required to return the specified data. The result set then only contains the data relevant to the third party, and minimizes excessive network traffic and computational complexity. Result set definitions can be saved for future use to further simplify data access.

In the following discussion, a general description of the system and its components is provided, followed by a discussion of the operation of the same.

Figure 1:
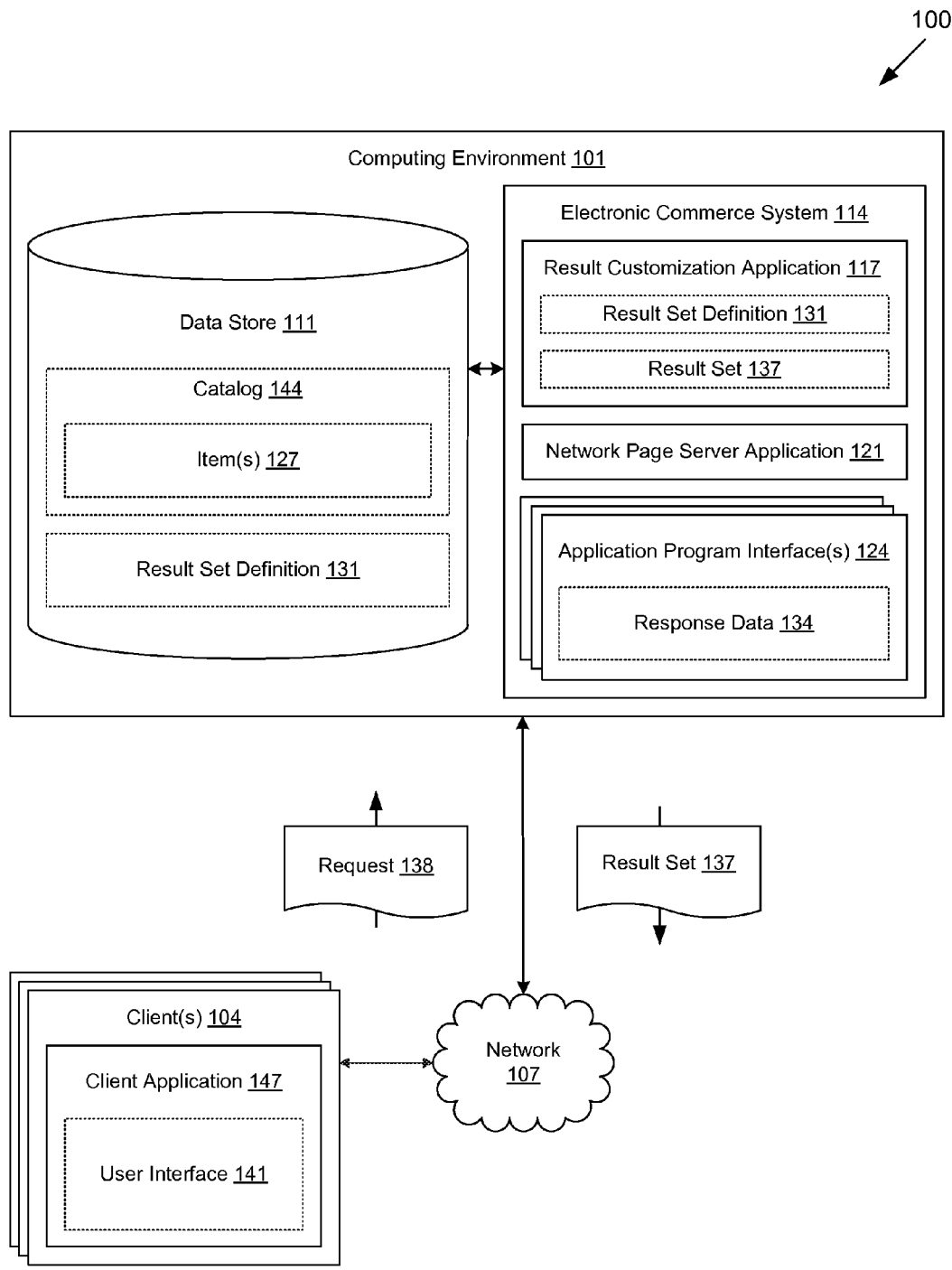
FIG. 1 is a drawing of a networked environment according to various embodiments of the present disclosure.

With reference to FIG. 1, shown is a networked environment 100 according to various embodiments. The networked environment 100 includes a computing environment 101 and a client 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 111 that is accessible to the computing environment 101. The data store 111 may be representative of a plurality of data stores 111 as can be appreciated. The data stored in the data store 111 for example, is associated with the operation of the various applications and/or functional entities described below.

The components executed on the computing environment 101, for example, include an electronic commerce system 114 comprising a result customization application 117, a network page server application 121, one or more application program interfaces 124, and other components. Other applications, services, processes, systems, engines, or functionality not discussed in detail herein may also be executed on computing environment 101.

The electronic commerce system 114 is executed in order to facilitate the online purchase of items 127 over the network 107. The electronic commerce system 114 also performs various backend functions associated with the online presence of a merchant in order to facilitate the online purchase of items 127 as will be described. For example, the electronic commerce system 114 generates network pages such as web pages or other types of network content that are provided to clients 104 for the purposes of selecting items for purchase, rental, download, lease, or other form of consumption as will be described.

The result customization application 117 is executed to facilitate access to data in a form as specified by a result definition 131. The result customization application 117 parses the result set definition to generate the appropriate application program interface 124 calls. The result customization application 117 also generates the appropriate transformations to be performed on the returned response data 134 to create the result set 137. Creating the result set 137 may be performed in response to a request 138 sent by a client 104, in response to a scheduled process, or another condition. Additionally, the result customization may encode for rendering a user interface 141 to facilitate the creation of result set definitions 131.

The network page server application 121 serves network pages to a client 104 to facilitate the purchase of items 127 from an electronic commerce system 114. The network page server application 121 may also serve network pages encoding a user interface 141 to facilitate the creation of a result set definition 131, or other network pages.

The application program interfaces 124 facilitate access to data. The data may be stored in a data store 111 or another location. The data may also relate to items 127, a catalog 144, or other information. The application program interfaces 124 return data in the form of response data 134 having a fixed schema corresponding to an application program interface 124 call.

The data stored in the data store 111 includes, for example, a catalog 144 having items 127, result set definitions 131, and potentially other data.

The client 104 is representative of a plurality of client devices that may be coupled to the network 107 The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a client application 147 and/or other applications. The client application 147 may be executed in a client 104 for example, to access network content served up by the computing environment 101 and/or other servers, thereby rendering a user interface 141. The client application 147 may, for example, correspond to a browser, a mobile application, etc., and the user interface 141 may correspond to a network page, a mobile application screen, etc. The client 104 may be configured to execute applications beyond the client application 147 such as, for example, browsers, mobile applications, email applications, social networking applications, and/or other applications.

Next, a general description of the operation of the various components of the networked environment 100 is provided. To begin, a client 104 creates a result set definition 131. The result set definition 131 may be created through a user interface 141. The user interface 141 may be encoded in a network page and served by the network page server application 121. The user interface 141 may also be a component of a dedicated client application 147, or be encoded by another approach.

The result set definition 131 may also be created by being encoded in an extensible markup language (XML) or another format, or be created by another approach. After the result set definition 131 is created, it may be stored in the data store 111.

Next, the result customization application 117 obtains a request 138 from a client 104 to generate a result set 137. The request may be communicated by the client 104 over a network 107, or through other means.

The electronic commerce system 114 may also enforce limitations on transactions performed with respect to clients 104 in order to incentivize the use of the result customization application 117. For example, the electronic commerce system 114 may restrict a number of requests 138 sent by a client 104 in a predefined time period. This would encourage the exploitation of the ability for clients 104 to obtain the desired result set 137 in response to a single request 138, as opposed to multiple requests 138 calling many related application program interfaces 124.

The electronic commerce system 114 may also limit an amount of data returned in response to requests 138 in a predefined time period. This would encourage the use of result set definitions 131 which generate result sets 137 having only the necessary attributes, as opposed to all the attributes returned by a fixed application program interface 124 schema. Other limitations may also be enforced by the electronic commerce system 114 to incentivize the use of result set definitions 131 by clients 104.

In embodiments in which the electronic commerce system 114 enforces transaction limitations, the result customization application 117 may communicate a rejection of the request 138 to the client 104 if the limitations are violated.

If the electronic commerce system 114 transaction limitations are not violated or in embodiments in which no limitations are enforced, the result customization application 117 obtains a result set definition 131 to facilitate generating the result set 137 in response to the request 138. The result set definition 131 may be loaded from a data store 111. The result set definition 131 may also be encoded as a component of the request 138. The result set definition 131 may also be obtained by another approach.

Once the result set definition 131 required to respond to the request 138 has been obtained, the result customization application 117 generates the appropriate application program interface 124 calls required to obtain the necessary response data 134. The application program interface 124 calls may be generated based at least in part on the result set definition 131, the request 138, response data 134 generated by executing another application program interface 124 call, or another component. In some embodiments, this requires analyzing a relationship model which relates a subset of the application program interfaces 124 to another subset of the application program interfaces 124.

For example, the relationship model may comprise a parent-child relationship between application program interfaces 124. The result customization application 117 generates the application program interface 124 calls by traversing a tree or other structure, and uses the returned path as a basis for generating the application program interface calls. For example, a result set definition may request page view statistics for every product in the "Toys" item category. A parent "product category" application program interface 124 may have a child "product" application program interface 124, which may then have a child "browsing" application program interface 124. The result customization application 117 may traverse the tree to determine that the "product category", "product", and "browsing" application program interfaces 124 require execution in order to construct the result set 137. Other structures and models may also define relationships between application program interfaces 124.

Generating the appropriate application program interface 124 calls may also comprise determining appropriate variables to insert into the application program interface 124 calls. For example, if a result set definition 131 requested price data for a "computers" product category, the result customization application 117 may determine the appropriate identifiers required by the application program interfaces 124 to query the "computers" product category. Other actions may also be taken in generating the application program interface calls.

In some embodiments, a result set definition 131 may be associated with one or more additional result set definitions 131. In these embodiments, generating the appropriate application program interface 124 calls may comprise iteratively generating application program interface 124 calls for the associated result set definitions 131.

Next, the result customization application 117 executes the generated application program interface 124 calls, resulting in a response data 134 corresponding to each of the executed calls. In embodiments in which an application program interface 124 call is generated as a function of response data 134 returned by another application program interface 124, the steps or functions of generating and executing the application program interface 124 calls may be repeated as necessary.

Once the response data 134 has been generated, the result customization application 117 determines the appropriate transformations to be performed on the response data 134 to produce the result set 137 conforming to the schema specified by the result set definition 131. Transformations may comprise selecting certain attributes of the response data 134 to be returned. Transformations may also comprise joining response data 134 returned by different application program interfaces 124 based at least in part on a shared or related attribute. Transformations may also comprise performing aggregate functions on the response data 134 such as counts, summations, minimums, maximums, or other aggregate functions. Other actions, functions, and approaches may also be used in transforming the response data 134. The transformations to be performed may be determined based at least in part on the request 138, related application program interfaces 124, the result set definition 131, or other factors.

The result customization application 117 may then communicate the generated result set 137 to the client 104 from which the request 138 originated. Communicating the result set 137 may comprise encoding the result set into a network page rendered by the network page server application 121. The result set 137 may also be encoded into a format recognizable by a dedicated client application 147. The result set 137 may also be stored in the data store 111 for later retrieval by a client 104. Other approaches may also be used to communicate the result set 137 to the client.

Figure 2:
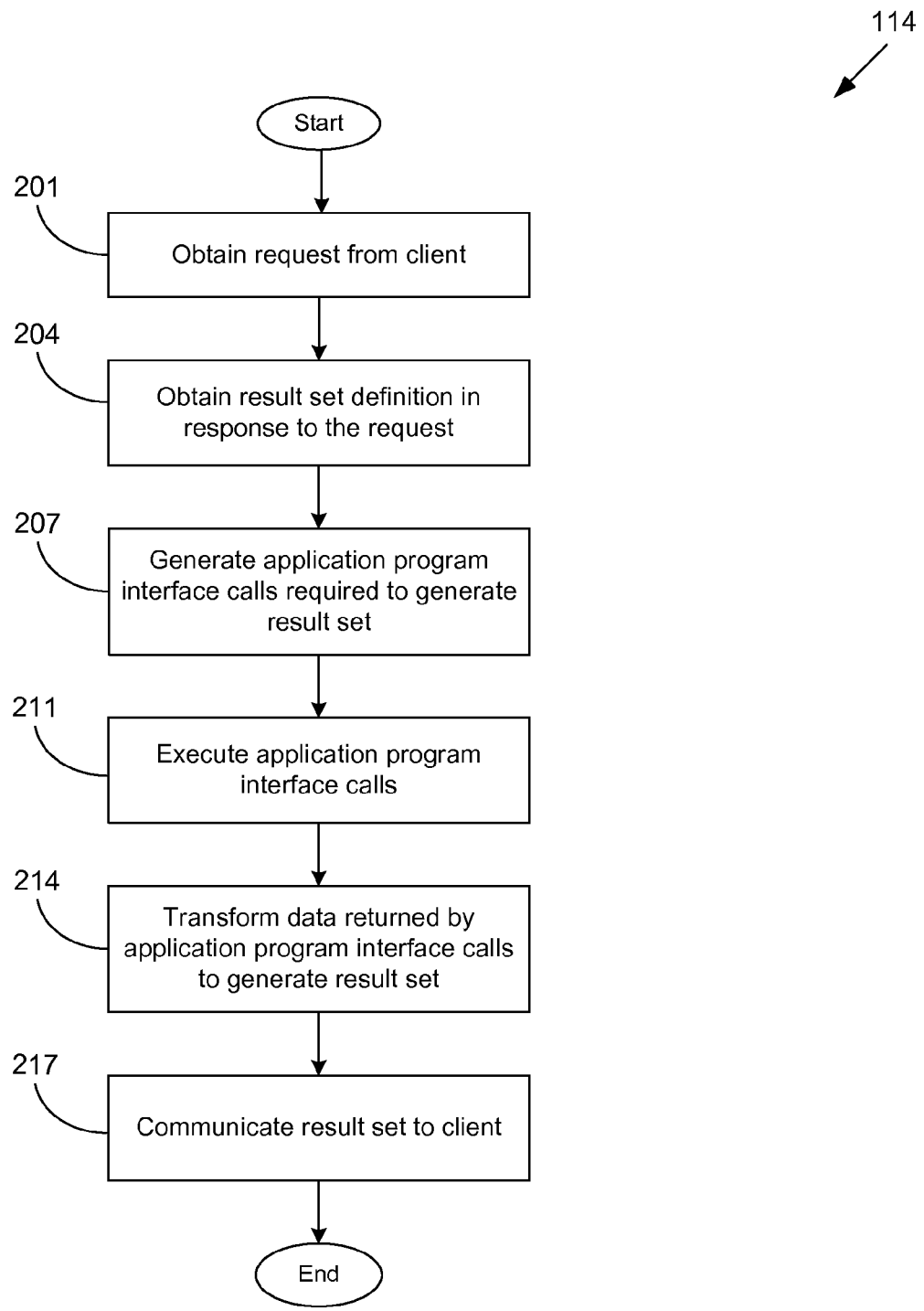
FIG. 2 is a flowchart illustrating one example of functionality implemented as portions of the result customization application executed in a computing environment in the networked environment of FIG. 1 according to various embodiments of the present disclosure.

Referring next to FIG. 2, shown is a flowchart that provides one example of the operation of a portion of the result customization application 117 (FIG. 1) according to various embodiments. It is understood that the flowchart of FIG. 2 provides merely an example of the many different types of functional arrangements that may be employed to implement the operation of the portion of the result customization application 117 as described herein. As an alternative, the flowchart of FIG. 2 may be viewed as depicting an example of steps of a method implemented in the computing environment 101 (FIG. 1) according to one or more embodiments.

Beginning with box 201, the result customization application 117 obtains a request 138 (FIG. 1). The request 138 may be obtained via a network 107 (FIG. 1) after being communicated by a client 104 (FIG. 1) to the computing environment 101. The request may be obtained through other approaches, as well.

Next, in box 204, the result customization application 117 obtains a result set definition 131 (FIG. 1) in response to the request 138. In some embodiments, obtaining the result set definition 131 comprises loading the result set definition 131 from a data store 111 (FIG. 1) based at least in part on a unique identifier associated with the result set definition 131. In other embodiments, the result set definition 131 may be communicated by the client 104 over the network 107.

In embodiments in which the result set definition 131 is communicated by the client 104, the result set definition 131 may be encoded in the request 138, or communicated distinct from the request 138. Communicating the result set definition 131 may be facilitated by a user interface 141 (FIG. 1) encoded as a network page served by a network page server application 121 (FIG. 1), encoded for rendering on a dedicated client application 147 (FIG. 1), or encoded in some other manner.

In box 207, after the result set definition 131 has been obtained, the result customization application 117 generates calls to the application program interfaces 124 (FIG. 1) required to complete the request 138. In some embodiments, this comprises determining the requisite application program interfaces 124 based at least in part on relationships between the different application program interfaces 124. These relationships may be expressed in a relationship model such as a tree, graph, or other data structure, by some other approach. The application program interfaces 124 to be called may also be defined in the result set definition 131, the request 138, or another source.

Generating the application program interface 124 calls may also comprise determining variables, values, or identifiers used as components of the application program interface 124 calls in order to retrieve the appropriate response data 134 (FIG. 1). Other actions may also be performed to generate the calls to the application program interfaces 124.

Next, in box 211, the result customization application 117 executes the generated application program interface 124 calls to generate a plurality of response data 134 (FIG. 1) corresponding to each of the executed calls to the application program interfaces 124. The response data 134 may comprise data loaded from a data store 111 including item 127 (FIG. 1) data maintained in a catalog 144 (FIG. 1) or other stored data. The response data 134 may also comprise attributes or metadata generated as a function of data stored in the data store 111 such as aggregate functions. The response data 134 may also comprise other data or attributes.

In box 214, the result customization application 117 performs transformations on the response data 134 to generate the result set 137 (FIG. 1) conforming to the schema defined in the result set definition 131. The transformations to be performed may be defined in the result set definition 131, the request 138, or another source. The transformations may also be generated by interpreting a schema associated with the result set definition 131 to determine the appropriate transformations. Other approaches may also be used to determine the requisite transformations.

The transformations may comprise selecting a subset of attributes of response data 134, joining response data 134 as a function of associated or shared attributes, executing aggregate functions on one or more attributes of the response data 134, or other functions as can be appreciated.

Once the result set 137 is generated, the result customization application 117 communicates the result set 137 to the client 104 in box 217. In some embodiments, this comprises encoding the result set 137 in a network page served by the network page server application 121 (FIG. 1) for viewing by a client application 147 (FIG. 1). In other embodiments, this comprises encoding the result set 137 in a format recognizable by a dedicated client application 147. In further embodiments, this comprises storing the result set in a data store 111 for later retrieval by a client 104. Other approaches may also be used to communicate the result set 137 to the client 104.

Figure 3:
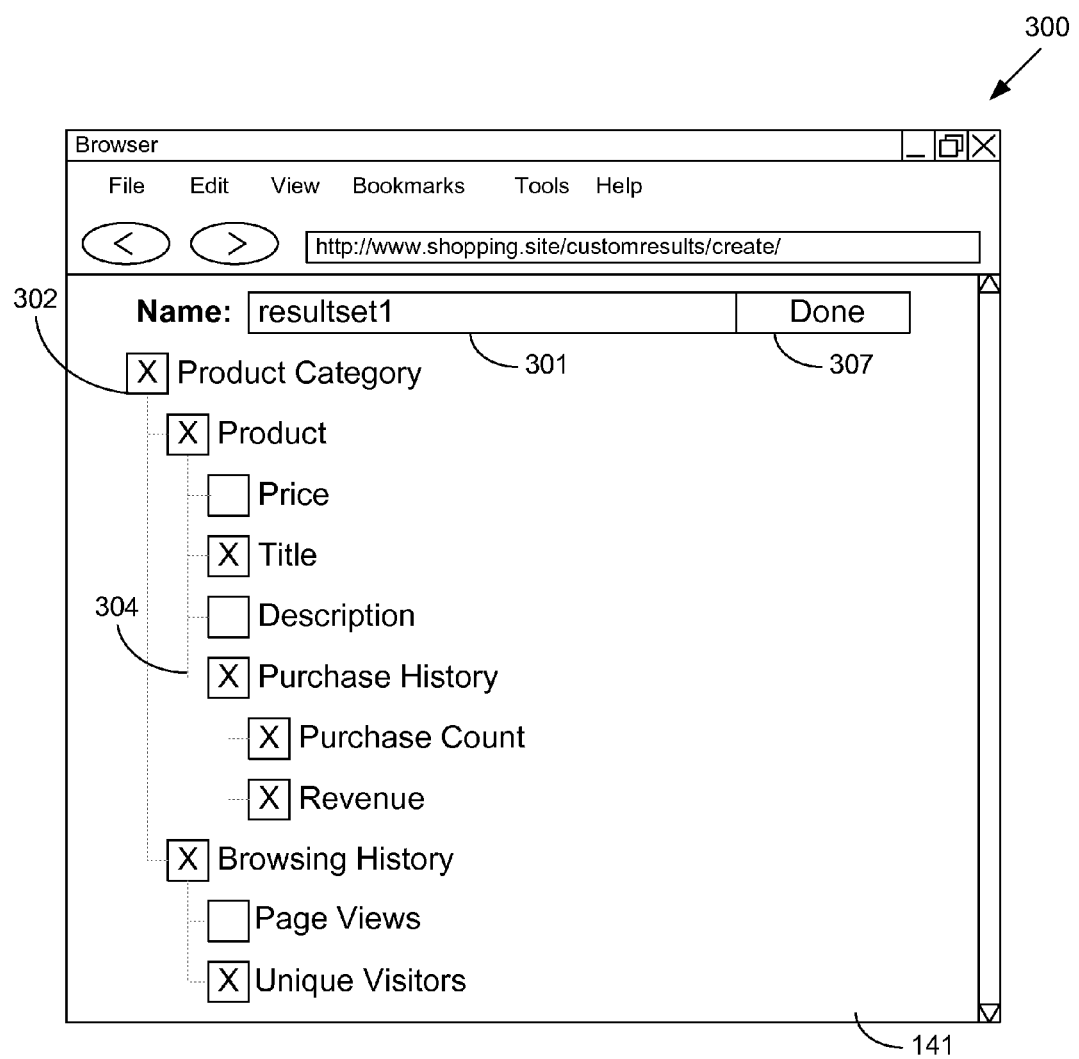
FIG. 3 is a drawing of an example of a user interface to facilitate creation of a result set and rendered by a client in the networked environment of FIG. 1 according to various embodiments of the present disclosure.

Moving on to FIG. 3, item 300 shows a non-limiting example of a user interface 141 (FIG. 1) as rendered by a client 104 (FIG. 1) to facilitate the creation of a result set definition 131 (FIG. 1). Shown is a structure of related application program interfaces 124 and associated attributes that may be selectable in creating a result set definition 131. In this embodiment, the application program interfaces 124 are related in a parent-child hierarchy, however other data structures or relationships may also be used to associate application program interfaces 124. Item 301 shows an input for an identifier associated with the result set definition 131. The facilitates access to the result set definition 131 by a client 104 after saving the result set definition 131 in a data store 111 (FIG. 1) or other location.

Item 302 represents a top-level parent application program interface 124. Each entry in the tree comprises a node representing either an application program interface 124 or an attribute. Item 304 shows a line linking a parent application program interface 124 to its child application program interfaces 124 and attributes. When a parent node is selected, the user interface 141 expands to display the child nodes. Here, the top-level parent application program interface 124 "Product Category" has been selected by the client 104, revealing child application program interfaces 124 "Product" and "Browsing History."

Item 307 comprises a button which, on clicking, encodes the created result set definition 131 for submission to the result customization application 117 (FIG. 1). Thereafter, the result set definition 131 may be saved to the data store for later retrieval and use by the client 104.

Figure 4:
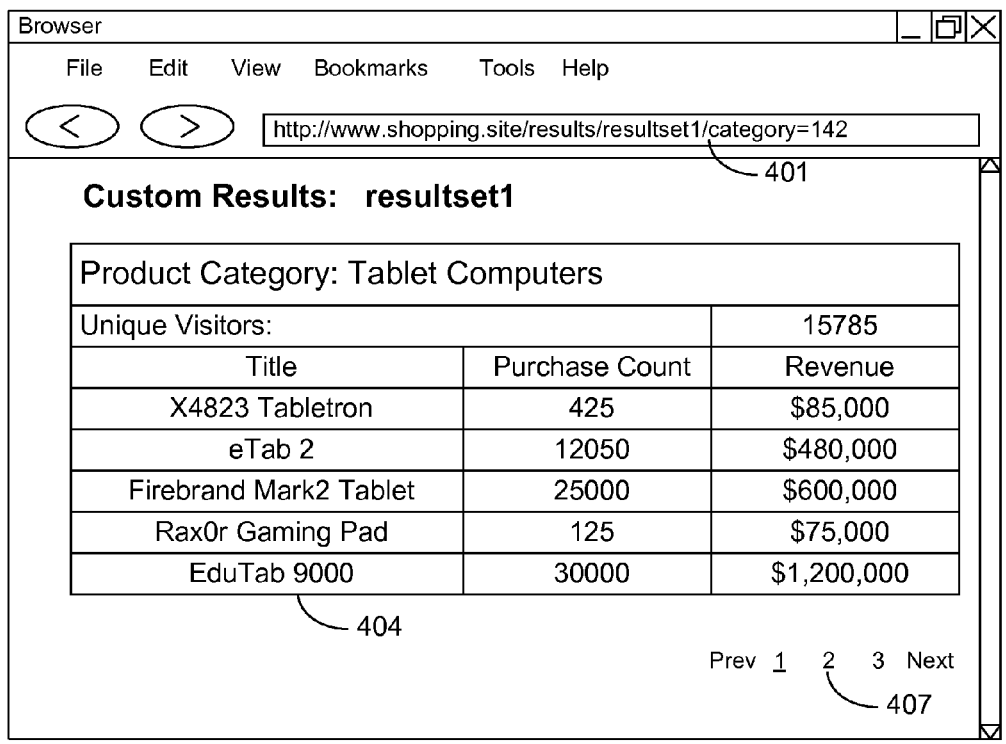
FIG. 4 is a drawing of an example of a user interface displaying custom results and rendered by a client in the networked environment of FIG. 1 according to various embodiments of the present disclosure.

With respect to FIG. 4, shown is a non-limiting example of a user interface 141 (FIG. 1) representing an encoded result set 137 (FIG. 1) in response to a request 138 (FIG. 1). The displayed result set 137 is in response to the result set definition 131 (FIG. 1) created using the user interface 141 embodied in item 300 (FIG. 3). In this embodiment, the user interface 141 comprises a network page served by the network page server application 121 (FIG. 1).

Item 401 comprises a request 138 as embodied by a uniform resource locator (URL) submitted to the network page server application 121. Contained within item 502 is an identifier "resultset1" used to specify the result set definition 131, as well as a parameter "category=142" to be used in conjunction with application program interface 124 (FIG. 1).

Item 404 comprises a table displaying data of the result set 137 conforming to the schema of the result set definition 131 created in FIG. 3. Though the result set 137 is displayed as a table, other visualizations or formats may also be used to render the result set 137. Item 407 comprises navigation tools to allow for paginated results in rendering the result set 137.

Figure 5:
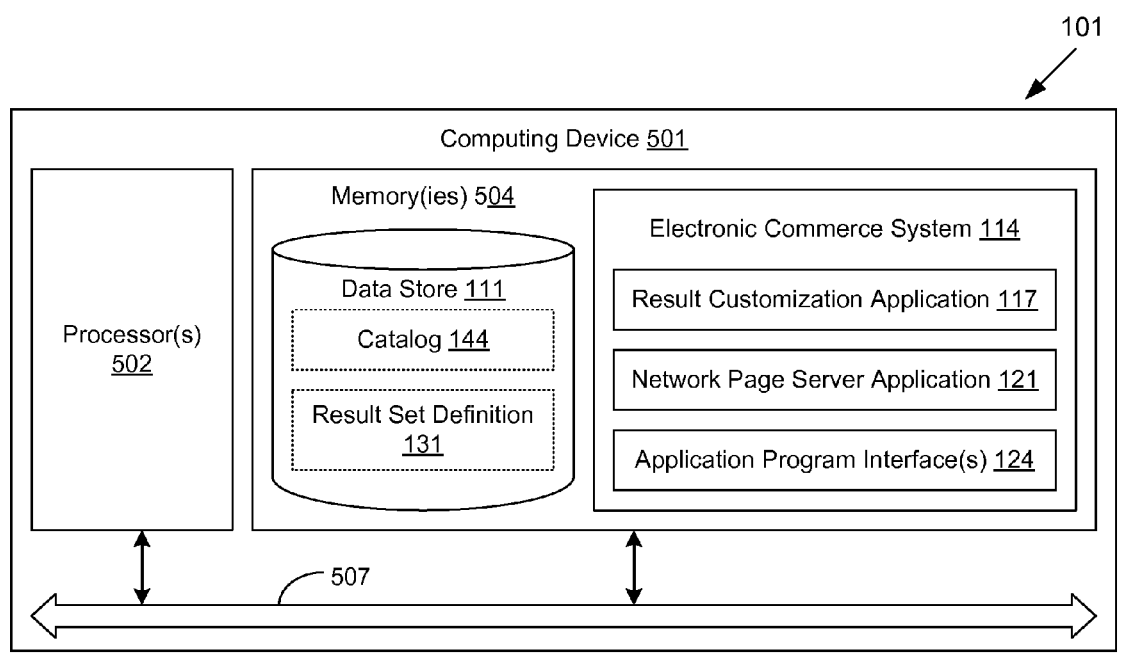
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 101 (FIG. 1) according to an embodiment of the present disclosure. The computing environment 101 includes one or more computing devices 501. Each computing device 501 includes at least one processor circuit, for example, having a processor 502 and a memory 504, both of which are coupled to a local interface 507. To this end, each computing device 501 may comprise, for example, at least one server computer or like device. The local interface 507 may comprise, for example, a data bus with an accompanying address/control bus or other bus structure as can be appreciated.

Stored in the memory 504 are both data and several components that are executable by the processor 502. In particular, stored in the memory 504 and executable by the processor 502 are an electronic commerce system 114 (FIG. 1) having a result customization application 117 (FIG. 1), a network page server application 121 (FIG. 1) and application program interfaces 124 (FIG. 1), and potentially other applications. Also stored in the memory 504 may be a data store 111 (FIG. 1) and other data. In addition, an operating system may be stored in the memory 504 and executable by the processor 502.

It is understood that there may be other applications that are stored in the memory 504 and are executable by the processor 502 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 504 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 504 and run by the processor 502, source code that may be expressed in proper format such as object code that is capable of being loaded into a random access portion of the memory 504 and executed by the processor 502, or source code that may be interpreted by another executable program to generate instructions in a random access portion of the memory 504 to be executed by the processor 502, etc. An executable program may be stored in any portion or component of the memory 504 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores and the memory 504 may represent multiple memories 504 that operate in parallel processing circuits, respectively. In such a case, the local interface 507 may be an appropriate network that facilitates communication between any two of the multiple processors 502, between any processor 502 and any of the memories 504, or between any two of the memories 504, etc. The local interface 507 may comprise additional systems designed to coordinate this communication, including, for example, performing load balancing. The processor 502 may be of electrical or of some other available construction.

Although the result customization application 117, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowchart of FIG. 2 shows the functionality and operation of an implementation of portions of the result customization application 117. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 502 in a computer system or other system. The machine code may be converted from the source code, etc. If embodied in hardware, each block may represent a circuit or a number of interconnected circuits to implement the specified logical function(s).

Although the flowchart of FIG. 2 shows a specific order of execution, it is understood that the order of execution may differ from that which is depicted. For example, the order of execution of two or more blocks may be scrambled relative to the order shown. Also, two or more blocks shown in succession in FIG. 2 may be executed concurrently or with partial concurrence. Further, in some embodiments, one or more of the blocks shown in FIG. 2 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the result customization application 117, that comprises software or code can be embodied in any non-transitory computer-readable medium for use by or in connection with an instruction execution system such as, for example, a processor 502 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a first computing device, wherein when executed, the program causes the first computing device to at least:
   obtain a request from a second computing device;
   in response to the request, obtain a result set definition from a data store, the result set definition defining a first schema for a custom result set to be returned in response to the request;
   determine, from at least one application program interface, a plurality of application program interface calls required to obtain data reflected in the first schema for the custom result set defined by the result set definition, the plurality of application program interface calls facilitating access to data in an electronic catalog by returning on execution corresponding ones of a plurality of response sets, the plurality of response sets having at least one corresponding predefined second schema distinct from the first schema;
   execute the plurality of application program interface calls to generate the plurality of response sets;
   perform a transformation on the plurality of response sets based at least in part on the first schema defined by the result set definition and the request to generate the custom result set, the custom result set comprising data based at least in part on the plurality of response sets and conforming to the first schema;
   communicate the custom result set to the second computing device;
   wherein individual ones of the plurality of application program interface calls are associated with at least one other application program interface call of the plurality of application program interface calls in a parent-child relationship model; and
   wherein the plurality of application program interface calls is determined based at least in part on the result set definition and the parent-child relationship model.

2. The non-transitory computer-readable medium of claim 1, wherein when executed, the program further causes the first computing device to at least encode for rendering a user interface facilitating a creation of the result set definition.

3. The non-transitory computer-readable medium of claim 1, wherein when executed, the program causes the first computing device to at least store the custom result set to the data store.

4. A system comprising:
   a data store storing at least computer-executable instructions; and
   at least one computing device comprising at least one processor and memory and in communication with the data store, the computer-executable instructions, when executed by the at least one processor, causing the at least one computing device to at least:

determine, from at least one application program interface, a plurality of application program interface calls required to obtain data reflected in a first schema for a custom result set indicated in a result set definition;

execute the plurality of application program interface calls to generate a plurality of response data sets, individual ones of the plurality of response data sets corresponding to a respective application program interface call of the plurality of application program interface calls and having a respective fixed second schema distinct from the first schema; and perform a transformation on the plurality of response data sets based at least in part on the first schema indicated in the result set definition to generate the custom result set, the custom result set comprising data based at least in part on the plurality of response data sets and conforming to the first schema.

5. The system of claim 4, wherein the computer-executable instructions further cause the at least one computing device to at least:

obtain a request from another computing device; and
communicate the custom result set to the other computing device.

6. The system of claim 4, wherein the computer-executable instructions further cause the at least one computing device to at least obtain the result set definition from another computing device.

7. The system of claim 4, wherein the result set definition is associated with at least one related result set definition, and the plurality of application program interface calls are further determined based at least in part on the at least one related result set definition.

8. The system of claim 6, wherein the computer-executable instructions further cause the at least one computing device to at least encode for rendering a graphical user interface to facilitate creation of the result set definition by a user.

9. The system of claim 4, wherein the computer-executable instructions further cause the at least one computing device to at least store the result set definition in data storage.

10. The system of claim 4, wherein the computer-executable instructions further cause the at least one computing device to at least obtain the result set definition from data storage.

11. The system of claim 4, wherein the computer-executable instructions further cause the at least one computing device to at least restrict an amount of a plurality of transactions associated with another computing device executed in a predefined time period, wherein the plurality of transactions are generated in response to the plurality of application program interface calls.

12. The system of claim 11, wherein restricting the amount of the plurality of transactions is further based at least in part on an amount of computational resources associated with an execution of the plurality of transactions.

13. The system of claim 11, wherein restricting the amount of the plurality of transactions is further based at least in part on a size of the custom result set.

14. The system of claim 4, wherein the plurality of application program interface calls are determined based at least in part on a relationship model associating a first subset of the plurality of application program interface calls to a second subset of the plurality of application program interface calls.

15. The system of claim 14, wherein the relationship model associates the plurality of application program interface calls in a parent-child hierarchy.

16. A method comprising:

obtaining, in a first computing device, from a second computing device, a request associated with a result set definition indicating a first schema for a custom result set;

determining, in the first computing device, from at least one application program interface, a plurality of application program interface calls required to obtain data reflected in the first schema indicated in the result set definition and a relationship model associated with the plurality of application program interface calls;

executing, in the first computing device, individual ones of the plurality of application program interface calls to generate a plurality of response sets, individual ones of the plurality of response sets corresponding to the individual ones of the plurality of application program interface calls, individual ones of the plurality of response sets conforming to a respective fixed second schema distinct from the first schema;

transforming, in the first computing device, the plurality of response sets to generate the custom result set, the custom result set comprising data based at least in part on the plurality of response sets and conforming to the first schema indicated in the result set definition; and communicating, by the first computing device, the custom result set to the second computing device;

wherein the plurality of application program interface calls facilitate access to data by returning on execution a corresponding response set of the plurality of response sets.

17. The method of claim 16, further comprising obtaining, by the first computing device, the result set definition from a data store.

18. The method of claim 16, further comprising obtaining, by the first computing device, the result set definition from the second computing device.

19. The method of claim 16, further comprising encoding for rendering, by the first computing device, a user interface to facilitate a creation of the result set definition.

20. The method of claim 19, further comprising encoding for storing, by the first computing device, the result set definition in a data store after the creation.

21. The method of claim 16, wherein the plurality of application program interface calls comprise at least one parent application program interface call and at least one child application program interface call-associated by the relationship model.

* * * * *